United States Patent
Procopio

(10) Patent No.: US 9,998,543 B2
(45) Date of Patent: Jun. 12, 2018

(54) REMOTE MONITORING OF USER APPLIANCES

(75) Inventor: Roberto Procopio, Turin (IT)

(73) Assignee: TELECOM ITALIA S.P.A., Milan (IT)

( * ) Notice: Subject to any disclaimer, the term of this patent is extended or adjusted under 35 U.S.C. 154(b) by 469 days.

(21) Appl. No.: 12/448,620

(22) PCT Filed: Dec. 27, 2006

(86) PCT No.: PCT/EP2006/012550
§ 371 (c)(1),
(2), (4) Date: Jan. 5, 2010

(87) PCT Pub. No.: WO2008/077436
PCT Pub. Date: Jul. 3, 2008

(65) Prior Publication Data
US 2010/0121948 A1   May 13, 2010

(51) Int. Cl.
*G06F 15/173* (2006.01)
*H04L 29/08* (2006.01)
*H04L 29/06* (2006.01)

(52) U.S. Cl.
CPC .......... *H04L 67/125* (2013.01); *H04L 67/28* (2013.01); *H04L 65/1006* (2013.01)

(58) Field of Classification Search
USPC ........................................................ 709/224
See application file for complete search history.

(56) References Cited

U.S. PATENT DOCUMENTS

| | | | |
|---|---|---|---|
| 6,581,094 B1 | 6/2003 | Gao | |
| 6,892,230 B1* | 5/2005 | Gu et al. | 709/220 |
| 2002/0103898 A1* | 8/2002 | Moyer et al. | 709/224 |
| 2005/0193201 A1* | 9/2005 | Rahman et al. | 713/169 |
| 2006/0004924 A1 | 1/2006 | Trossen | |
| 2006/0115074 A1* | 6/2006 | Hollatz et al. | 379/265.09 |
| 2010/0004763 A1* | 1/2010 | Murakami et al. | 700/83 |

FOREIGN PATENT DOCUMENTS

WO    WO-01/33338 A2    5/2001

OTHER PUBLICATIONS

"Transmission System for Handheld Terminals (DVB-H)", Digital Video Broadcasting (DVB), European Standard (Telecommunication Series) ETSI EN 302 304 V1.1.1, pp. 1-14, (2004).

(Continued)

*Primary Examiner* — Alan S Chou
(74) *Attorney, Agent, or Firm* — Finnegan, Henderson, Farabow, Garrett & Dunner, L.L.P.

(57) ABSTRACT

A method for operating a server of a communication system includes at least one user appliance and a monitoring device adapted to perform a remote monitoring of the at least one user appliance through the intermediation of the server, the at least one user appliance being associated with a list of attributes that can take predetermined values. The method includes: 1) receiving the list of attributes associated with the at least one user appliance, and the values that can be taken by each of said attributes; 2) storing at the server the list of attributes with the related values received in 1); and 3) sending said list of attributes with the related values to the monitoring device.

16 Claims, 8 Drawing Sheets

(56) References Cited

OTHER PUBLICATIONS

"IP Datacast Over DVB-H: Program Specific Information (PSI)/Service Information (SI)", Digital Video Broadcasting (DVB), Technical Specification, ETSI TS 102 470 V1.1.1, pp. 1-37, (2006).
Roach, "Session Initiation Protocol (SIP)-Specific Event Notification", The Internet Society, Network Working Group, Request for Comments : 3265, pp. 1-39 (2002).
Niemi, "Session Initiation Protocol (SIP) Extension for Event State Publication", The Internet Society, Network Working Group, Request for Comments: 3903, pp. 1-33, (2004).

* cited by examiner

US 9,998,543 B2

REMOTE MONITORING OF USER APPLIANCES

CROSS REFERENCE TO RELATED APPLICATION

This application is a national phase application based on PCT/EP2006/012550, filed Dec. 27, 2006.

BACKGROUND OF THE INVENTION

Field of the Invention

The present invention relates to remote monitoring and control of user appliances.

Description of the Related Art

The Internet Engineering Task Force ("IETF") has developed a communications protocol called Session Initiation Protocol ("SIP") which can accommodate a number of different modes of communication. SIP, according to proposed standard RFC3261, is an application-layer control and signalling protocol for creating, modifying and terminating interactive communications sessions between one or more participants. These sessions may include voice, video, chat, interactive games and virtual reality, e.g., Internet multimedia conferences, Internet telephone calls and multimedia distribution. SIP invitations (i.e., the SIP method INVITE) are used to create sessions. These invitations can carry session descriptions which allow participants to agree on a set of compatible media types. SIP supports user mobility by proxying and redirecting requests to the user's current location, which the user can register. The SIP architecture includes user agents, where a user agent is a device running an application program that can act as both a user agent client ("UAC") and a user agent server ("UAS"). A client is an application program that sends SIP requests. A client may or may not interact directly with a human user. A server is an application program that accepts requests from a client in order to service those requests and sends back responses to those requests. Thus, a UAS is a server application that contacts the user, when a SIP request addressed to the user is received, and that returns a response on behalf of the user. The response accepts, rejects or redirects the request.

In addition there are servers which are not User Agents. These can be Proxy, Redirect or Registrar servers. A Proxy server is an intermediary program that acts as both a server and a client for the purpose of making requests on behalf of other clients. Requests are serviced internally by the Proxy server or are passed by it to other servers, possibly after translation. A Proxy server interprets, and, if necessary, rewrites a request message before forwarding it. In an Internet context, the Proxy server receives requests from a UAC, even when directed to a host with a different URL. After processing, it sends these on to the destination URL. A Redirect server is a server that accepts a SIP request, maps the address into zero or more new addresses and returns these addresses to the client. Unlike a Proxy server, it does not initiate its own SIP request. Unlike a UAS, it does not accept calls. A Registrar server is a server that accepts registration (e.g. REGISTER) requests. It keeps a list of the registered addresses it receives for the UAS or UAC devices in its area and is typically co-located with a Proxy or Redirect server so it can share its information with them.

In a SIP configuration the UAC sends a request to a UAS via one or more Proxy servers. Typically one UAC may address or be capable of addressing multiple UASs. Further, in a standard SIP architecture, endpoints, i.e., UASs, are always able to communicate directly with each other. Applying this structure to a typical multimedia conference, a control application would act as a UAC to initiate calls or to invite others to conferences and it would act as a UAS to accept invitations. The role of UAC and UAS as well as Proxy and Redirect servers are defined on a request-by-request basis. For example, the user agent initiating a call acts as a UAC when sending the initial INVITE request and as a UAS when receiving a BYE request from the device called. Similarly, the same software can act as a Proxy server for one request and as a Redirect server for the next request. The SIP UAS will typically be embedded in SIP phones, PCs and PDAs.

US 2002/0103898 aims at using SIP as the basic architecture to implement remote control of appliances networked together. To this purpose it defines a type of URL (Universal Resource Locator) to be used for Networked appliance systems which allows for "user friendly" discovery of the appliance address. Moreover, it defines a DO message adapted to contain control and query commands specific for directing and receiving status information from Networked Appliances. A DO message will carry a command that is appropriate for a target appliance, such as "Turn the light on", or a query such as "What is the temperature". The command would trigger a single response, indicative of its result, which would be carried by the standard SIP response mechanism.

As stated by US 2002/0103898, in a typical embodiment, a home can have all or many of its appliances connected to a network. With such a system, the homeowner can access the network and turn on the lights in the driveway, start the coffee maker, and raise or lower the temperature in the home, before leaving the office. Also, a clock can co-ordinate the user's agenda or perhaps turn on an appliance.

In order to provide interoperability between networked digital devices, U.S. Pat. No. 6,581,094 discloses a Uniform Device Descriptor (UDD) file associated with each digital device of a set of digital devices (e.g., printer, camera, scanner, computer, fax machine). Each UDD file specifies a set of attributes associated with its corresponding digital device.

SUMMARY OF THE INVENTION

However, the Applicant notes that the use of these UDD files is disadvantageous in that 1) it requires a complicated and time consuming manual setting operation to configure each equipment involved with such files; 2) such files are based on a fixed scheme, defined a priori, for a set of possible devices, each with a set of prefixed attributes. Considering the huge amount of possible different devices, said predefined set will be necessarily limited and not exhaustive; 3) in case a new device, non contemplated by said fixed scheme, is installed in a networked appliance system, a reconfiguration operation of all the equipment involved is required.

The Applicant found that these drawbacks can be overcome through a new mechanism according to which each user appliance is configured only with a list of its attributes and of the values that can be taken by said attributes, and the other equipment involved in a communication with said appliance (such as proxies and/or residential gateways and/or monitoring devices) are adapted to learn, according to a self-learning procedure, the attribute list and the related values of said appliance.

As shown in more detail below, this new mechanism overcomes the above mentioned drawbacks in that 1) it limits the configuration of an appliance only to the list of its attributes and to the related value, and does not require any configuration of the other equipment involved in a communication with said appliance (such as proxies and/or residential gateways and/or monitoring devices); 2) it allows the list of the attributes with the related values of each appliance to be defined case by case (e.g. by the appliance manufacturer) according to the actual capabilities of the appliance, without the restriction to follow a prefixed scheme; 3) it is flexible in that, in case a new appliance is installed in a networked appliance system, it only requires the configuration of the new appliance with the list of its actual attributes with the related values. Then, the other equipment involved in a communication with said appliance have the possibility to learn the attributes and related value of the new appliance through the self-learning procedure.

In the present description and claims, the term
"server" is used to indicate network equipment comprising hardware, software and/or firmware means adapted to provide predetermined services to other equipments (in the art usually referred to as "clients"); for example the term server may be used to indicate a Proxy server and/or a Presence server associated with a service provider or a residential gateway;
"attribute" is used to indicate a feature of an appliance, that can take one or more predetermined values.

In a first aspect, the present invention relates to a method for operating a server of a communication system further comprising at least one user appliance and a monitoring device adapted to perform a remote monitoring of the at least one user appliance through the intermediation of the server, the at least one user appliance being associated with a respective list of attributes, wherein each attribute can take at least one predetermined value, the method comprising:

1) receiving the attributes associated with the at least one user appliance, and the at least one predetermined value that can be taken by each of said attributes;

2) storing at the server the attributes with the related values received in 1); and 3) sending said attributes with the related values to the monitoring device.

For example, in a SIP implementation of the method of the invention, the list of attributes with the related values in 3) may be sent through one or more SIP NOTIFY messages.

The list of attributes can comprise one or more attributes.

In 1) the attributes and the values that can be taken by each of said attributes can be received at the server from the at least one user appliance or from another server.

In 1) the attributes and the related values may be received all together (e.g. within a same message SIP NOTIFY message) or separately (e.g. in different SIP NOTIFY messages).

Typically, the method further comprises 4) receiving from the at least one user appliance a message requesting to be registered at the server. For example, in a SIP implementation of the method of the invention, said registering message can be a SIP REGISTER message.

According to an embodiment, the list of attributes with the predetermined values that can be taken by said attributes are received in 1) comprised in said registering message.

According to an embodiment, 1) is advantageously subordinated to 5) requesting to the at least one user appliance the list of attributes, with the values that can be taken by said attributes. According to an embodiment, the execution of 5) is subordinated to the receipt of said registering message.

According to an embodiment, the method further comprises 6) receiving from the monitoring device a request to receive the attributes associated with the at least one user appliance and the predetermined values that can be taken by said attributes.

According to an embodiment, the method further comprises 7) receiving from the monitoring device a subscribing message for receiving information about the values taken by the attributes of the list associated with the at least one user appliance. For example, in a SIP implementation of the method of the invention, said subscribing message can be a SIP SUBSCRIBE message.

According to an embodiment, in 6) the request is comprised in the subscribing message of 7). According to this embodiment, said subscribing message may comprise, for example, data informing whether or not the monitoring device already has the list of attributes and the values that can be taken by said attributes.

According to an embodiment, the execution of 5) is subordinated to 6).

According to an embodiment, the execution of 3) is subordinated to 6).

Advantageously, the method may further comprise 8) checking whether said attribute list and the predetermined values that can be taken by said attributes have already been stored at the server for the at least one user appliance. In the negative, the method comprises the carrying out of 5), 1), 2) and 3). In the positive, the method comprises retrieving the stored list of attributes with the related values and executing step 3) by sending to the monitoring device the retrieved stored list of attributes with the related values.

Advantageously, the method further comprises receiving a reporting message from the at least one user appliance comprising the value currently taken by at least one of the attributes of the list associated therewith. For example, in a SIP implementation of the method of the invention, said reporting message can be a SIP PUBLISH message or a SIP NOTIFY message. Advantageously, the method further comprises notifying said reporting message to the monitoring device. For example, in a SIP implementation of the method of the invention, said message can be a SIP NOTIFY message.

According to an embodiment, upon receipt of said reporting message from the at least one user appliance, the method comprises sending a predetermined command message to another user appliance.

Advantageously, the method further comprises receiving from the monitoring device a command message for the at least one user appliance. Advantageously, the method further comprises notifying said command message to the at least one user appliance.

According to an embodiment, said command message requests the user appliance to set at least one of the attributes of said attribute list to one of the predetermined values that can be taken by said attribute.

According to another embodiment, said command message requests the user appliance to inform about the value currently taken by at least one of the attributes of said attribute list.

According to a preferred embodiment of the invention, messages are exchanged according to the session initiation protocol (SIP), the SIP extension for Specific Event Notification RFC3265 and the SIP extension for Event State Publication RFC3903.

In a SIP implementation of the method of the invention, the server may comprise a SIP Proxy server. The SIP Proxy server may be, for example, associated with a service provider or with a residential gateway.

Messages may be exchanged between the server and the monitoring device and between the server and the at least one user appliance directly or through the intermediation of another apparatus, for example, of another server (e.g. a presence server).

In a second aspect, the present invention relates to a method for managing, at a monitoring device of a communication system, a remote monitoring of at least one user appliance, the at least one user appliance being associated with a respective list of attributes, wherein each attribute can take at least one predetermined value, the method comprising:

a) receiving the attributes associated with the at least one user appliance and the at least one predetermined value that can be taken by each of said attributes;

b) storing at the monitoring device the attributes and the related values received in a).

In a), the attributes and the related values can be received from a server o from the user appliance.

Typically, the method further comprises c) sending a subscribing message for receiving information about the values taken by the attributes of the list associated with the at least one user appliance.

Typically, the method comprises d) requesting the attribute list associated with the at least one user appliance and the predetermined values that can be taken by said attributes.

According to an embodiment, the request in d) is comprised in the subscribing message of c).

Advantageously, the method comprises e) checking whether or not the monitoring device has already stored the attribute list with the related values associated with the at least one user appliance. In the negative, the method comprises executing d), a) and b). In the positive, the method advantageously comprises sending data informing that the monitoring device already has the attribute list and the related values associated with the at least one user appliance. According to an embodiment, said data are sent within the subscribing message in c).

According to an embodiment, d) is executed by sending data informing that the monitoring device does not have the attribute list and the related values associated with the at least one user appliance. According to an embodiment, said data are sent within the subscribing message in c).

Advantageously, the method further comprises f) receiving a message notifying the value currently taken by at least one attribute of the list associated with the at least one user appliance.

Advantageously, the method further comprises g) sending a command message for the at least one user appliance.

According to an embodiment, said command message requests the at least one user appliance to set at least one of the attributes of said attribute list to one of the predetermined values that can be taken by said attribute.

According to another embodiment, said command message requests the at least one user appliance to inform about the value currently taken by at least one of the attributes of said attribute list.

According to a preferred embodiment of the invention, messages are exchanged according to the session initiation protocol (SIP), the SIP extension for Specific Event Notification RFC3265 and the SIP extension for Event State Publication RFC3903.

For example, message in c) advantageously is a SIP SUBSCRIBE message. Message in a) advantageously is a SIP NOTIFY message. Message in f) advantageously is a SIP NOTIFY message. Message in g) advantageously is a DO message, as defined in the above mentioned US 2002/0103898.

Typically, messages are exchanged between the monitoring device and the at least one user appliance. Preferably, they are exchanged through the intermediation of at least one server. According to a SIP implementation of the invention, the server may comprise a SIP Proxy server. The SIP Proxy server may be, for example, associated with a service provider or a Residential Gateway.

In a third aspect, the present invention relates to a communication system comprising a server, a monitoring device and a local area network, the local area network comprising a plurality of user appliances, each being associated with a respective list of attributes, wherein each attribute can take at least one predetermined value and wherein each user appliance is associated with modules adapted to communicate the respective list of attributes with the related predetermined values to the server; the server comprises modules adapted to receive from the user appliances their respective lists of attributes with the related predetermined values, to store them and to communicate the received lists of attributes and the related predetermined values to the monitoring device; and the monitoring device is associated with modules adapted to receive from the server said lists of attributes and the related predetermined values and to store them.

According to an embodiment, the local area network comprises a (residential) gateway to connect the local area network to an external communication network (ECN). Typically the server is in communication with the residential gateway.

The server may be comprised in the local area network (LAN server) or may be outside the local area network, comprised in the external communication network (ECN server).

According to an embodiment the communication system also comprises an external communication network (e.g., a wide area network or WAN) connected to the local area network.

The monitoring device may be comprised in the local area network or may be a monitoring device external to the local area network. For example, the monitoring device is in communication with the local area network through the external communication network.

Advantageously, the external communication network comprises an ECN server. In this case, the LAN server is advantageously adapted to communicate to the ECN server the lists of attributes and the related predetermined values, and the ECN server comprises modules adapted to receive from the LAN server said lists of attributes and the related predetermined values, to store them and to communicate them to the external monitoring device.

The LAN may be within a home, an office, a vehicle and/or similar environments. The WAN can, for example, be the Internet.

In a further aspect, the present invention relates to a server for use in a communication system, the communication system comprising at least one user appliance and a monitoring device, the at least one user appliance being associated with a respective list of attributes, wherein each attribute can take at least one predetermined value, the server comprising modules adapted to:

1) receive the attributes associated with the at least one user appliance, and the at least one predetermined value that can be taken by each of said attributes;

2) store at the server the attributes with the related values received in 1); and 3) send said attributes with the related values to the monitoring device.

As to further features of this aspect of the invention reference is made to what already disclosed above.

In a further aspect, the present invention relates to a monitoring device for remote monitoring at least one user appliance associated with a respective list of attributes, wherein each attribute can take at least one predetermined value, the monitoring device being associated with modules adapted to:

a) receive the attributes associated with the at least one user appliance and the at least one predetermined value that can be taken by each of said attributes; and to b) store the attributes and the related values received in a).

As to further features of this aspect of the invention reference is made to what already disclosed above.

In the various aspect of the invention, the monitoring device and/or the user appliances can be either "SIP-enabled", that is, they are adapted to support use of SIP and extensions thereof themselves, or "Non-SIP-enabled". In this latter case, they may be associated with a suitable interface adapted to translate incoming SIP messages to the specific protocol of the appliance/device and outgoing messages from the specific protocol of the appliance/device to SIP messages.

As an example and not by way of limitation, an appliance may include a CD-player, a videocassette recorder, an alarm clock, a camera, a door bell, a sprinkler, an air-conditioning system, a heating system, a temperature sensor, a washing machine, a dishwasher, an alarm system, a computer, a fax machine, a printer, a phone (which may be a mobile phone, a fixed phone or another phone), a personal digital assistant (PDA) and so on. The monitoring device could be a phone (which may be a mobile phone, a fixed phone or another phone), a personal digital assistant (PDA), a personal computer, and so on.

BRIEF DESCRIPTION OF THE DRAWINGS

The features and advantages of the present invention will be made apparent by the following detailed description of some exemplary embodiments thereof, provided merely by way of non-limiting examples, description that will be conducted by making reference to the attached drawings, wherein.

DETAILED DESCRIPTION OF THE INVENTION

Figure 1:
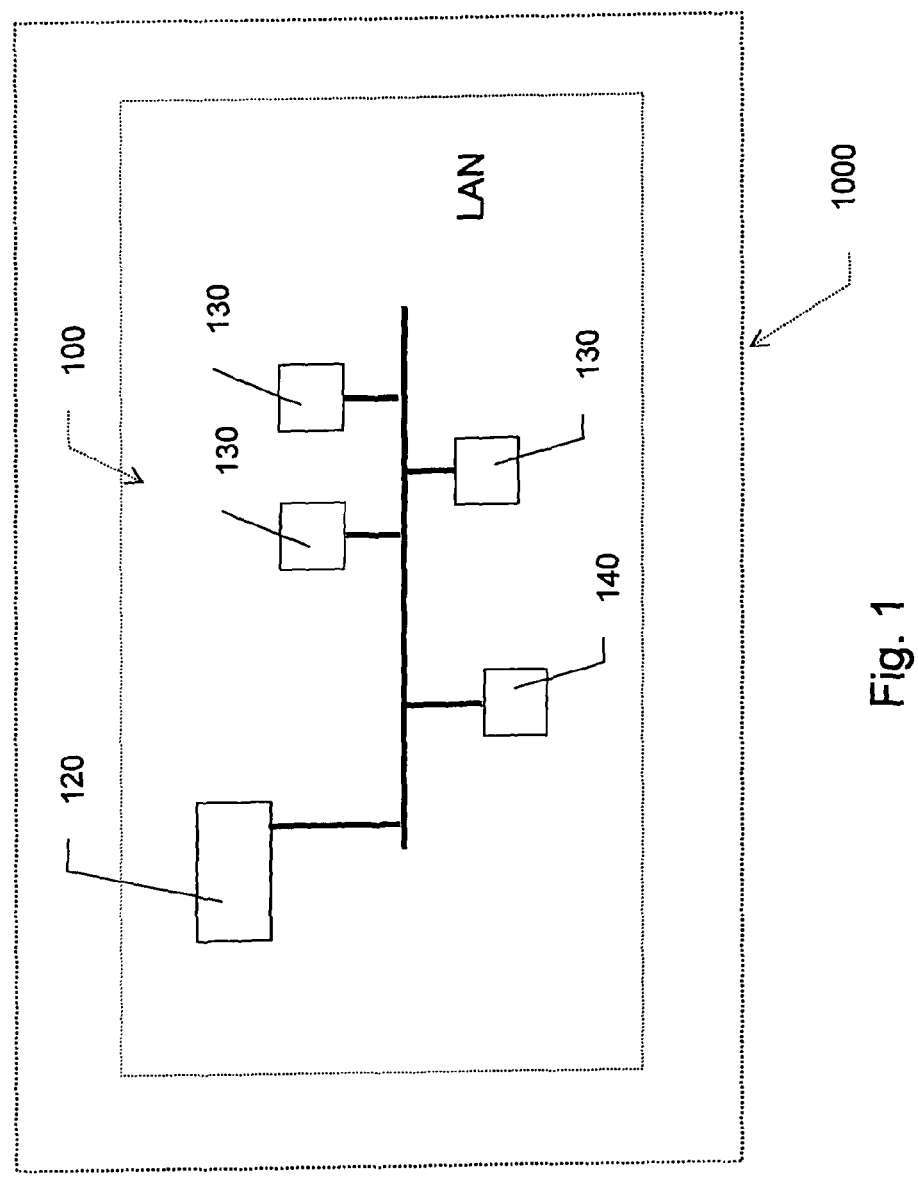
FIG. 1 schematically shows an embodiment of a communication system according to the invention.

FIG. 1 shows a communication system 1000 according to a first embodiment of the invention comprising a local area network (LAN) 100 that in its turn comprises a plurality of user appliances 130, a monitoring device 140 and a LAN server 120 connected together through wireless link, wired link or a combination thereof, according to techniques known in the art.

The local area network may any type of local network.

The plurality of user appliances 130, the monitoring device 140 and the LAN server 120 comprise hardware modules, software modules and/or combinations thereof, adapted to implement the invention, according to the various aspects thereof.

As stated above, the local area network 100 may cover a local area like a home, an office, a vehicle or similar environments.

For example, the local area network can be within a home, appliances 130 can be household appliances (e.g., a CD-player, a videocassette recorder, an alarm clock, a camera, a door bell, a sprinkler, an air-conditioning system, a heating system, a temperature sensor, a washing machine, a dishwasher, an alarm system, a computer, a fax machine, a printer, a phone, a personal digital assistant (PDA) and so on) and the monitoring device 140 can be a computer, a phone, a personal digital assistant (PDA) and so on.

Even if in the embodiment shown only one monitoring device 140 is shown, the communication system 1000 may also comprise a plurality of monitoring devices.

For simplicity and not by way of limitation, in the remainder of the description reference is made to an exemplary embodiment of the invention wherein server 120, appliances 130 and device 140 themselves, or through a suitable interface, are adapted to execute communications sessions using SIP and extensions thereof, and messages between appliances 130, device 140 and server 120 are exchanged through SIP and extensions thereof.

In the exemplary embodiment, server 120 is acting as a Presence server within the LAN 100.

In the exemplary embodiment, a SIP REGISTER message is used by an appliance 130 and by the device 140 to register with the server 120, a SIP SUBSCRIBE message is used by the monitoring device 140 and by the server 120 to be entitled to receive information about the user appliances 130 of the LAN; a SIP PUBLISH message is used by a user appliance 130 of the LAN to report the server 120 about a change of state thereof; and a SIP NOTIFY message is used, as a consequence of the Subscription procedure, to notify the monitoring device 140 and the server 120, about the attribute list and related possible values of a user appliance 130 of the LAN and about the current state thereof.

Moreover, the above mentioned DO message can be used by the monitoring device 140 to command a user appliance 130 to change its state or to be informed about the current state thereof.

The body of the SIP messages can be, for example, in XML format.

Appliances 130 and device 140 (or the SIP interfaces associated therewith) are advantageously adapted to run a dedicated application, generally referred to as user agent, which is adapted to implement the invention. The user agent may be implemented in hardware modules, software modules, firmware modules and/or combinations thereof.

Each appliance 130 and/or device 140 is typically identified by an identifier. For example, the identifiers are SIP-URI (or TEL-URI) identifiers.

The user appliances 130 and the monitoring device 140 are adapted to register themselves with the server 120 through a SIP REGISTER message. Moreover, the server 120 is adapted to store in a suitable database the list of the plurality of user appliances 130 and monitoring device 140 registered therewith.

Each user appliance 130 is associated with a predetermined list of attributes, each of which being able to take predetermined values. For example, a washing machine of a predetermined model could be associated with the following attribute list: power, temperature of operation, program of operation, spin-dryer speed; and such attributes could respectively take the following values: power=on/off; temperature of operation=30, 40, 60, 90° C.; program of operation: Cotton, Wool, Colored . . . ; spin-dryer speed=300, 400, 600, 900 rpm.

Monitoring device 140 wishing to perform a remote monitoring and control of some or all user appliances 130 of the LAN 100, will send a SUBSCRIBE message to the server 120 to be entitled to have information about any change of state of the user appliances 130 of its interest.

When receiving a SUBSCRIBE message from a monitoring device 140, the server 120 is adapted to identify and authenticate the monitoring device 140 and to check whether it is entitled, according to a predetermined authorization policy, to set up the subscription to said user appliances 130.

Once successfully subscribed to the user appliances 130, the monitoring device 140 is entitled to be informed, through NOTIFY messages from the server 120, about any change of state of the appliances of the LAN 100. Moreover, through a DO message, the monitoring device 140 could be entitled to set an attribute of the user appliance 130 to a desired value or to check the current values taken by the attributes of the user appliance 130.

In order to be able to interact with user appliances 130, the monitoring device 140 and the server 120 need to know the list of attributes associated with the user appliances 130 and the predetermined values that can be taken by each of said attributes.

According to the invention, the monitoring device 140 is adapted to "learn" said list of attributes, with the related predetermined values, directly from the user appliances 130 or from the server 120 according to a self-learning procedure. According to different possible implementations of the invention, the monitoring device 140 can be adapted to learn said lists of attributes with the related predetermined values either under an explicit request by the monitoring device 140 or automatically. In the first case, the explicit request may be sent from the monitoring device 140 alone or in association with another message (for example, within the body of a SUBSCRIBE message). In the second case, the self-learning procedure may be automatically performed in conjunction with a predetermined action (e.g., after the monitoring device 140 sent a SUBSCRIBE message for setting up a subscription to receive information about one or more user appliances 130).

By learning the attributes of a user appliance and the values that can be taken by said attributes, the monitoring device receive such attributes and the related possible values and store them in a structured way, in a suitably designed database, in order to be subsequently able to visualize them to the user through a suitable user interface and to exploit them so as to be informed about the values taken by the attributes of the user appliance 130, to set the attributes of the user appliance 130 to desired values or to check the current values taken by the attributes of the user appliance 130 at a definite moment.

Moreover, according to the invention, also the server 120 is adapted to learn both said lists of attributes and the related predetermined values directly from the user appliances 130, according to a self-learning procedure. According to different possible implementations of the invention, the server 120 can be adapted to learn said lists of attributes with the related predetermined values either under an explicit request by the server 120 or automatically. In the first case, the explicit request may be sent from the server 120 to a user appliance 130 in consequence of the reception of a REGISTER message from the user appliance 130, or in consequence of the reception of a request by a monitoring device 140 for receiving said lists. In the second case, the server can receive the lists of attributes with the related predetermined values in conjunction with a predetermined action (e.g., in conjunction with the reception of a REGISTER message from the user appliance 130).

By learning the attributes of a user appliance and the values that can be taken by said attributes, the server receive such attributes and the related possible values and store them in a structured way, in a suitably designed database, in order to be subsequently able to exploit them to communicate them to the monitoring device and to act as intermediary between the monitoring device and the user appliance.

Figure 2:
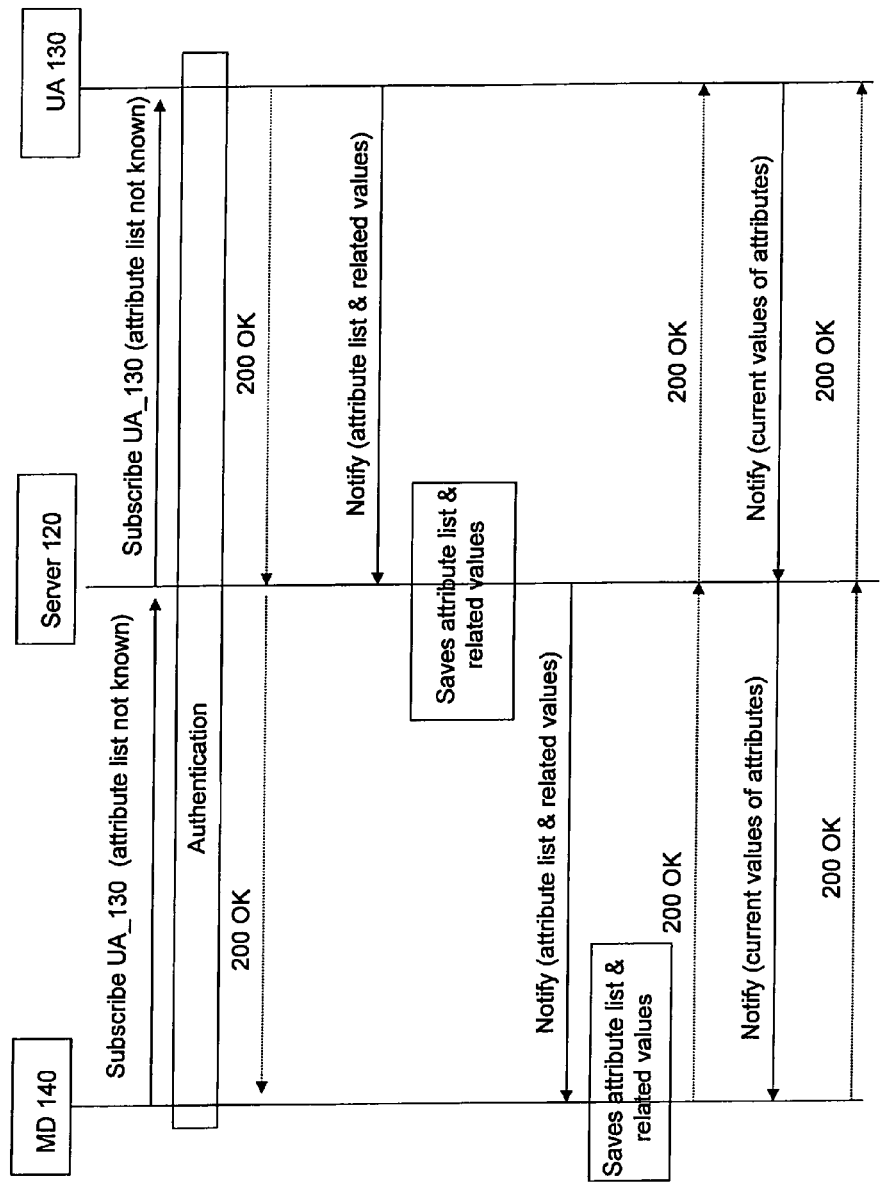
FIG. 2 schematically shows a message flow for an exemplary implementation of the invention with reference to the embodiment of FIG. 1.

FIG. 2 shows an example of the principal messages exchanged when the monitoring device (MD) 140 sets up a subscription to receive information about a user appliance (UA) 130 and does not know the list of attributes with the related predetermined values, which are associated with said user appliance 130.

In particular, in FIG. 2, monitoring device 140 sends to the server 120 a SUBSCRIBE message for setting up a subscription to receive information about user appliance 130 and requests the list of attributes, and the related predetermined values, that are associated with said user appliance 130. In the embodiment shown, the request is made by including in the body of the SUBSCRIBE message suitable data informing that monitoring device 140 does not know the list of attributes.

Server 120 receives the SUBSCRIBE message from the monitoring device 140 and parses the body of the received SUBSCRIBE message to know whether or not the monitoring device 140 already know the list of attributes, with the related predetermined values, that are associated with said user appliance 130. When recognizes that the monitoring device 140 does not know the list of attributes, with the related predetermined values, the server 120 checks whether or not it has already stored at the database said list. In the affirmative, it retrieves the stored list of attributes associated with the user appliance 130, with the related predetermined values, and sends it to the monitoring device 140 (not shown). In the negative (case shown in FIG. 2), it requests the user appliance 130 for its list of attributes, with the related predetermined values, for example by sending to it a SIP SUBSCRIBE message containing such request.

The user appliance 130 receives said SIP SUBSCRIBE message, authenticates and identifies the monitoring device 140 according to techniques known in the art, acknowledges the SIP SUBSCRIBE message with a 200 OK SIP message and sends to the server 120 a NOTIFY message notifying its list of attributes and the related predetermined values.

The server 120 propagates the 200 OK SIP message to the monitoring device 140, receives the list of attributes, with the related predetermined values, from the user appliance 130, stores the received list of attributes, with the related predetermined values, in its database by associating the list and the values to an identifier of the user appliance 130, and sends the same to the monitoring device 140 through a NOTIFY message.

The monitoring device 140 receives the list of attributes, with the related predetermined values, stores them in a suitable monitoring device database, and acknowledges the NOTIFY message with a 200 OK message, that is propagated to the user appliance 130 by the server 120.

Upon, receipt from the server 120 of the SUBSCRIBE message containing the request for its list of attributes, with the related predetermined values, the user appliance 130 advantageously sends to the server 120 a NOTIFY message reporting the values, among the predetermined ones, currently taken by its attributes.

The server 120 receives said NOTIFY message from the user appliance 130 and sends a NOTIFY message to the monitoring device 140 notifying the current values of each attribute.

The monitoring device 140 receives the NOTIFY message from the server 120, stores the received values in its database and acknowledges the NOTIFY message with a 200 OK message, that is propagated to the user appliance 130 by the server 120.

It is noted that even if not shown, before sending the SUBSCRIBE message to the server 120, the monitoring device 140 will check whether the list of attributes with the related predetermined values, that are associated with user appliance 130, has already been stored in its database. In the negative, the monitoring device 140 will send to the server 120 a request for said list, as disclosed above. In the affirmative, it will abstain from sending said request to the server. According to an embodiment, it may send in the body of the SUBSCRIBE message suitable data informing that monitoring device 140 already knows the list. In this case, the server 120, recognizing that the monitoring device 140 already knows the list, will abstain from sending it to the monitoring device 140 and will only send to it the NOTIFY message notifying the actual values taken by the attributes of the user appliance 130.

At this time, any time the value taken by one of the attributes of the user appliance 130 changes, the user appliance 130 will report the server 120 about the change through a suitable PUBLISH message and the server 120 will notify said change to the monitoring device 140 through a suitable NOTIFY message (not shown).

An example of the SIP SUBSCRIBE message of FIG. 2 sent by the monitoring device 140 (MD_140@home1.net) to the server 120, informing that the monitoring device 140 does not know the list of attributes of the user appliance 130 (UA_130@home1.net) may be the following:

```
SUBSCRIBE sip:UA_130@home1.net SIP/2.0
Via: SIP/2.0/UDP
    [5555::aaa:bbb:ccc:ddd]:1357;comp=sigcomp;branch=z9
    hG4bKehuefdam
Max-Forwards: 70
P-Access-Network-Info: 3GPP-UTRAN-TDD; utran-cell-
    id-3gpp=234151D0FCE11
Route: <sip:pcscf1.home1.net:7531;lr;comp=sigcomp>,
    <sip:orig@scscf1.home1.net;lr>
P-Preferred-Identity: <sip:MD_140@home1.net>
Privacy: none
```

-continued

```
From: <sip:MD_140@home1.net>;tag=31415
To: <sip:UA_130@home1.net>
Call-ID: b89rjhnedlrfjflslj40a222
CSeq: 123 SUBSCRIBE
Require: sec-agree
Proxy-Require: sec-agree
Security-Verify: ipsec-3gpp; q=0.1; alg=hmac-sha-1-
    96; spi-c=98765432; spi-s=87654321; port-
    c=8642; port-s=7531
Event: presence
Supported: eventlist
Expires: 7200
Accept: application/pidf+xml, application/rlmi+xml,
    application/SLP+xml, multipart/related
Attibute List & Values: Not known
Contact:
    <sip:[5555::aaa:bbb:ccc:ddd]:1357;comp=sigcomp>
Content-Length: 0
```

In this example, with the wording "application/SLP+xml" in the field "Accept" the monitoring device 140 informs the user appliance 130 that it supports the self-learning procedure (SLP) according to the invention (that is, it has the capability of learning the attributes of the user appliance and the possible values that can be taken by said attributes). Moreover, with the wording "Attribute List & Values: Not known" it informs the user appliance 130 that it does not know the list of attributes and the related possible values thereof.

An example of the SIP NOTIFY message of FIG. 2 sent to the monitoring device 140 (MD_140@home1.net) for notifying the list of attributes of the user appliance 130 (UA_130@home1.net) (e.g. power, temperature of operation, program of operation, spin-dryer speed, in the case of a washing machine) and the related possible values (power=on/off; temperature of operation=30, 40, 60, 90° C.; program of operation: Cotton, Wool, Colored; spin-dryer speed=300, 400, 600, 900 rpm) may be the following:

```
NOTIFY
sip:[5555::aaa:bbb:ccc:ddd]:1357;comp=sigcomp
SIP/2.0
Via: SIP/2.0/UDP
    rls.home1.net;branch=z9hG4bK240f34.1
Max-Forwards: 70
P-Charging-Vector: icid-
    value="AyretyU0dm+6O2IrT5tAFrbHLso=323551024";
    orig-ioi=home1.net
P-Charging-Function-Addresses:
    ccf=[5555::b99:c88:d77:e66];
    ccf=[5555::a55:b44:c33:d22];
    ecf=[5555::1ff:2ee:3dd:4ee];
    ecf=[5555::6aa:7bb:8cc:9dd]
Route: <sip:scscf1.home1.net;lr>,
    <sip:pcscf1.visited1.net;lr>
From: <sip:UA_130@home1.net>;tag=31415
To: <sip:MD_140@home1.net>
Call-ID: b89rjhnedlrfjflslj40a222
CSeq: 89 NOTIFY
Subscription-State: active;expires=7200
Require: eventlist
Event: presence
Contact:
    <sip:[5555::aaa:bbb:ccc:ddd]:1357;comp=sigcomp>
Content-Type: application/SLP+xml;charset="UTF-8"
Content-Length:
<?xml version="1.0" encoding="UTF-8"?>
    <diff:pidf-full
    xmlns="urn:ietf:params:xml:ns:pidf"
    xmlns:diff="urn:ietf:params:xml:ns:pidf-diff"
```

```
        xmlns:
rp="urn:ietf:params:xml:ns:pidf-rpid"
            xmlns:dm="urn:ietf:params:xml:ns:pidf:
data-model"
xmlns:pcp="urn:ietf:params:xml:ns:pidf:caps"
xmlns:ci="urn:ietf:params:xml:ns:pidf:cipid"
            xmlns:ud=" urn:ietf:params:xml:ns:SLP"
        entity="pres:MD_140@home1.net"
        version="1">
    <ud:device id="wash machine">
        <name>Power</name>
        <instance value=On, Off/>
        <name>Temperature</name>
        <instance value= 30, 40, 60, 90/>
        <name>Program</name>
        <instance value=Cotton, Wool, Colored/>
        <name>Spin-dryer</name>
        <instance value=300, 400, 600, 900/>
    </ud:device>
</diff:pidf-full>
```

An example of the SIP NOTIFY message of FIG. 2 sent to the monitoring device 140 (MD_140@home1.net) for notifying the current values taken by the list of attributes of the user appliance 130 (UA_130@home1.net) (e.g. power=on; temperature of operation=60° C.; program of operation: Cotton; spin-dryer speed=600 rpm) may be the following:

```
NOTIFY
        sip:[5555::aaa:bbb:ccc:ddd]:1357;comp=sigcomp
        SIP/2.0
Via: SIP/2.0/UDP
        rls.home1.net;branch=z9hG4bK240f34.1
Max-Forwards: 70
P-Charging-Vector: icid-
        value="AyretyU0dm+6O2IrT5tAFrbHLso=323551024";
        orig-ioi=home1.net
P-Charging-Function-Addresses:
        ccf=[5555::b99:c88:d77:e66];
        ccf=[5555::a55:b44:c33:d22];
        ecf=[5555::1ff:2ee:3dd:4ee];
        ecf=[5555::6aa:7bb:8cc:9dd]
Route: <sip:scscf1.home1.net;lr>,
        <sip:pcscf1.visited1.net;lr>
From:<sip:UA_130@home1.net>;tag=31415
To: <sip:MD_140@home1.net> Call-ID:
        b89rjhnedlrfjflslj40a222
CSeq: 89 NOTIFY
Subscription-State: active;expires=7200
Require: eventlist
Event: presence
Contact:
        <sip:[5555::aaa:bbb:ccc:ddd]:1357;comp=sigcomp>
Content-Type: application/SLP+xml;charset="UTF-8"
Content-Length:
<?xml version="1.0" encoding="UTF-8"?>
    <diff:pidf-full
        xmlns="urn:ietf:params:xml:ns:pidf"
        xmlns:diff="urn:ietf:params:xml:ns:pidf-diff"
            xmlns:
rp="urn:ietf:params:xml:ns:pidf-rpid"
            xmlns:dm="urn:ietf:params:xml:ns:pidf:
data-model"
xmlns:pcp="urn:ietf:params:xml:ns:pidf:caps"
xmlns:ci="urn:ietf:params:xml:ns:pidf:cipid"
            xmlns:ud=" urn:ietf:params:xml:ns:SLP"
        entity="pres:MD_140@home1.net"
        version="1">
    <ud:device id="wash machine">
        <name>Power</name>
        <instance>On/>
        <name>Temperature</name>
        <instance>60/>
        <name>Program</name>
        <instance>Cotton/>
        <name>Spin-dryer</name>
        <instance=600/>
    </ud:device>
</diff:pidf-full>
```

Figure 3:
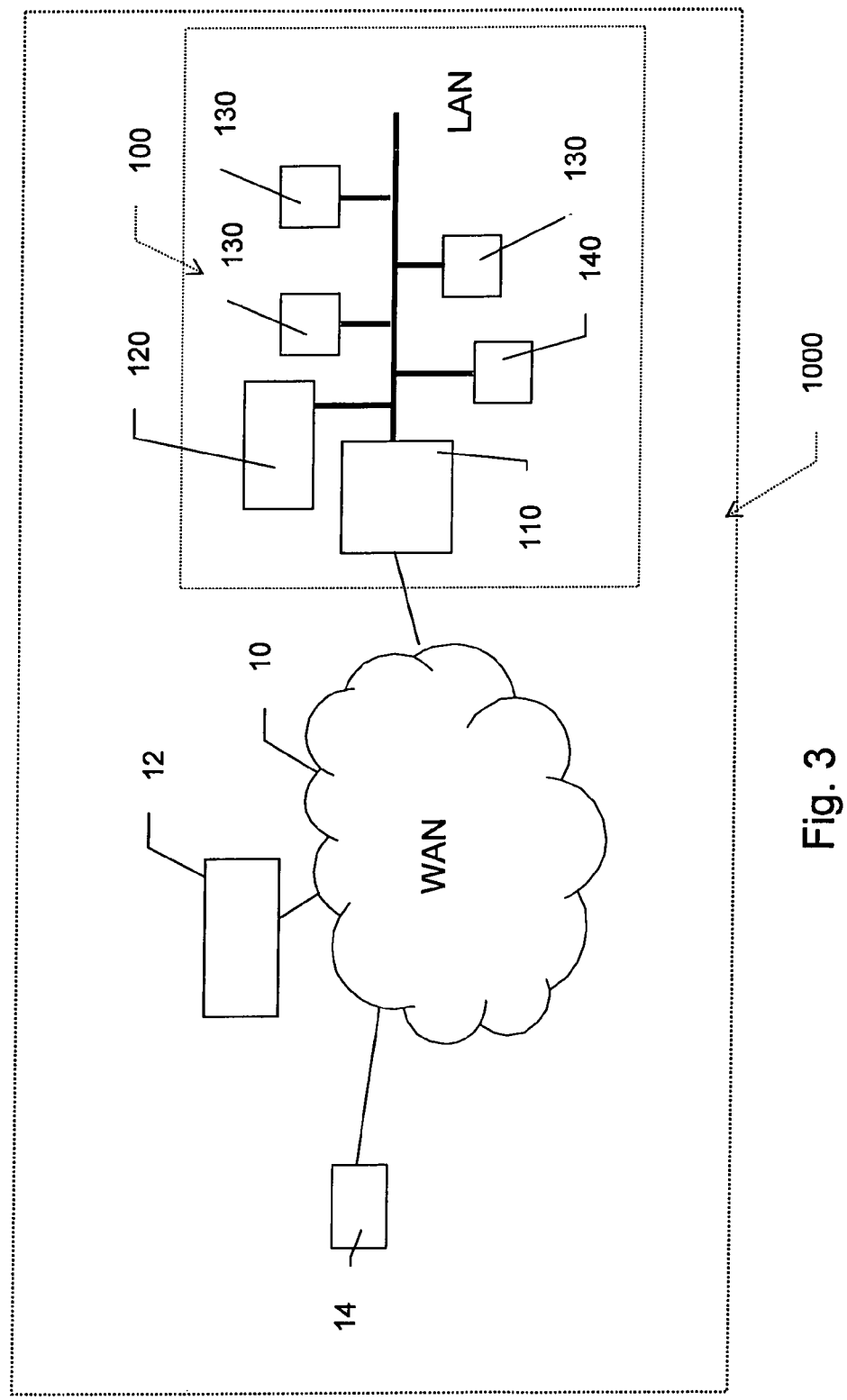
FIG. 3 schematically shows another embodiment of a communication system according to the invention.

FIG. 3 shows a communication system 1000 according to a second embodiment of the invention comprising a local area network (LAN) 100, a wide area network (WAN) 10, a WAN server 12 associated with the wide area network 10 and an external monitoring device 14. In its turn, the local area network 100 comprises a plurality of user appliances 130, an internal monitoring device 140, a residential gateway 110 and a LAN server 120, which are connected together through wireless link, wired link or a combination thereof. The local area network 100 is connected to the WAN 10 through the residential gateway 110. The external monitoring device 14 is in communication with the LAN 100 through the WAN 10 and the WAN server 12.

As to the structural and functional features of the LAN 100, reference is made to what disclosed above with reference to FIGS. 1 and 2.

The LAN 100 of FIG. 3 differs from the LAN 100 of FIG. 1 for the presence of the residential gateway 110 which provides an interface with the WAN 10.

The residential gateway 110 can be, for example, a conventional firewall/network address translator. Moreover, the LAN server 120 can be hosted within the residential gateway 110.

As to the structural and functional features of the monitoring device 14, reference is made to what disclosed above with reference to the internal monitoring device 140 of FIG. 1.

As stated above, the local area network 100 may cover a local area like a home, an office, a vehicle or similar environments. The WAN 10 could be, for example, the Internet.

For example, the local area network can be within a home, appliances 130 can be household appliances (e.g., a CD-player, a videocassette recorder, an alarm clock, a camera, a door bell, a sprinkler, an air-conditioning system, a heating system, a temperature sensor, a washing machine, a dishwasher, an alarm system, a computer, a phone, a personal digital assistant (PDA) and so on); the internal monitoring device 140 can be a computer, a phone, a personal digital assistant (PDA) and so on; and the external monitoring device 14 can be a computer, a phone, a personal digital assistant (PDA) and so on. For example, the external monitoring device 14 can be a mobile phone belonging to the homeowner through which the homeowner wishes to perform a remote monitoring and control (e.g., from his office or his car) of the user appliances 130 at home.

In an exemplary embodiment of the invention, as well as LAN server 120, appliances 130 and device 140, also the WAN server 12 and the external monitoring device 14 itself, or through a suitable interface, are adapted to execute communications sessions using SIP and extensions thereof, and messages are exchanged through SIP and extensions thereof.

Moreover, in the exemplary embodiment, WAN server 12 is a Presence server within the WAN 10.

The LAN 100 is typically identified in the communication system 1000 by an identifier associated with the gateway 110 and the monitoring device 14 is typically identified by a device identifier. For example, in case of SIP, the identifiers are SIP-URI (or TEL-URI) identifiers.

As well as LAN server 120, appliances 130 and device 140, also the external monitoring device 14 and the WAN server 12 comprise hardware modules, software modules, firmware modules and/or combinations thereof, adapted to implement the invention, according to the various aspects thereof.

As stated above, each user appliance 130 is associated with a predetermined list of attributes, each of which being able to take predetermined values.

Monitoring device 14 wishing to perform a remote monitoring and control of some or all user appliances 130 of the LAN 100, will send a SUBSCRIBE message to the server 12 to be entitled to have information about any change of state of the user appliances 130 of its interest.

Once successfully subscribed to the user appliances 130, the monitoring device 14 is entitled to be informed, through NOTIFY messages from the server 12, about any change of state of the appliances 130 of the LAN 100. Moreover, through a DO message, the monitoring device 14 could be entitled to set an attribute of the user appliances 130 to a desired value or to check the current values taken by the attributes of the user appliances 130.

In order to be able to interact with user appliances 130, the monitoring device 14 and the server 12 need to know the list of attributes with the related predetermined values associated with the user appliances 130.

The monitoring device 14 is adapted to "learn" said lists of attributes with the related predetermined values directly from the user appliances 130 or from the server 12 according to a self-learning procedure, similarly to what disclosed above with reference to the internal monitoring device 140.

Moreover, also the server 12 is adapted to learn the lists of attributes with the related predetermined values, associated with the user appliances 130, directly from the user appliances 130 or from the LAN server 120 according to a self-learning procedure, similarly to what disclosed above with reference to the LAN server 120.

Figure 4:
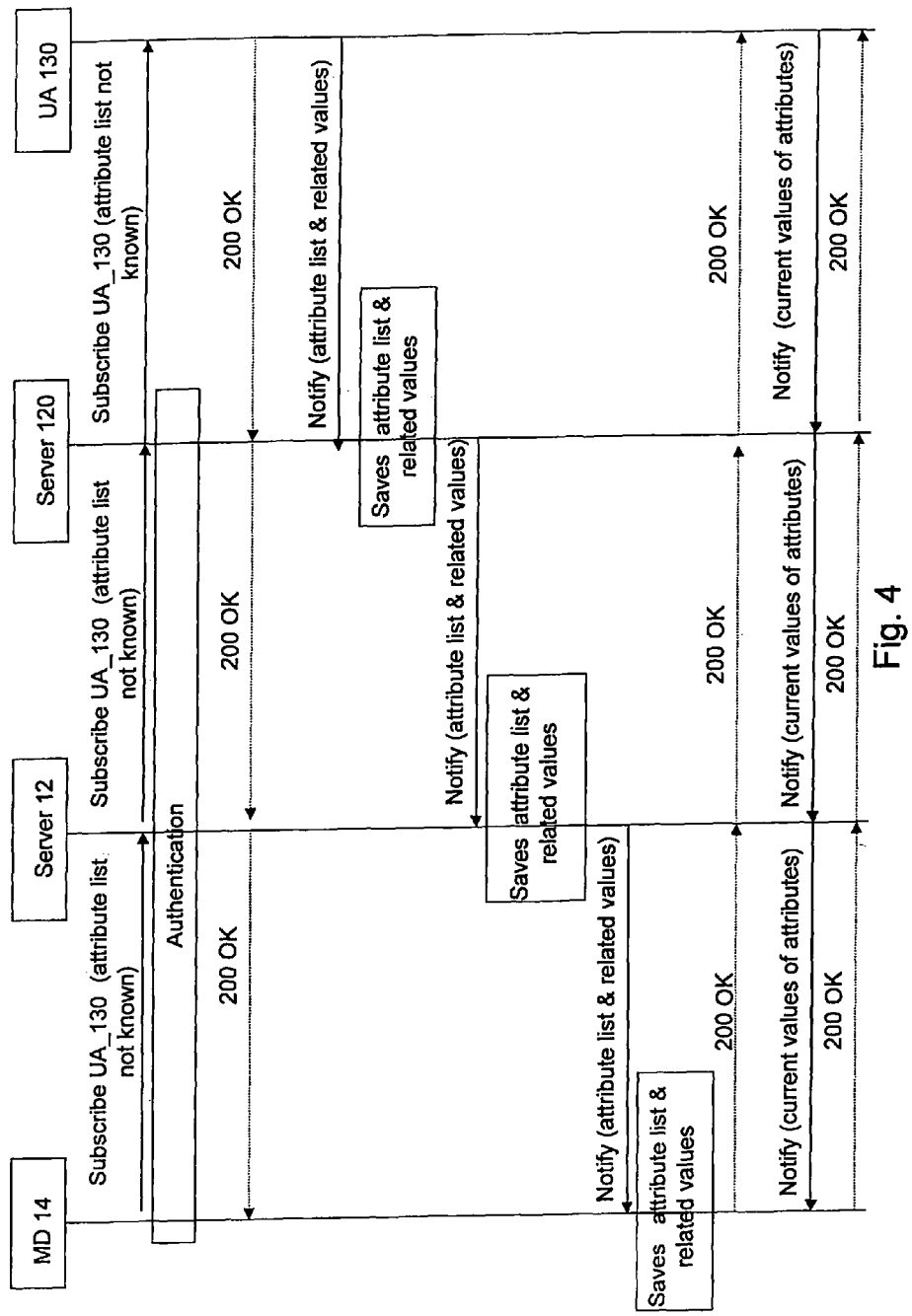
FIG. 4 schematically shows a message flow for an exemplary implementation of the invention with reference to the communication system of FIG. 3.

FIG. 4 shows an example of the principal messages exchanged when the external monitoring device 14 sets up a subscription to receive information about a user appliance 130 within the LAN and does not know the list of attributes with the related predetermined values, that are associated with said user appliance 130.

In particular, in FIG. 4, monitoring device (MD) 14 sends to the server 12 a SUBSCRIBE message for setting up a subscription to receive information about (UA) user appliance 130 and requests the server 12 for the list of attributes, and the related predetermined values, that are associated with said user appliance 130. In the embodiment shown, the request is made by including in the body of the SUBSCRIBE message suitable data informing that monitoring device 14 does not know the list of attributes, with the related predetermined values, that are associated with said user appliance 130.

Server 12 receives the SUBSCRIBE message from the monitoring device 14 and identifies, according to techniques known in the art, the server 120 which is associated with the LAN 100 comprising the user appliance 130. Moreover, the server 12 examines the body of the received SUBSCRIBE message to know whether the monitoring device 14 already knows the list of attributes, with the related predetermined values, that are associated with said user appliance 130. When recognizes that the monitoring device 14 does not know the list of attributes, with the related predetermined values, the server 12 checks whether it has already stored at its database said list. In the affirmative (case not shown), it retrieves from its database the stored list of attributes, with the related predetermined values, and sends it to the monitoring device 14. Moreover, it changes the body of the SUBSCRIBE message to include suitable data informing that monitoring device 14 already knows the list of attributes, with the related predetermined values, and sends it to the server 120 previously identified. In the negative (case shown in FIG. 4), the server 12 forwards the SUBSCRIBE message as it is to the server 120.

Server 120 receives the SUBSCRIBE message from the server 12, authenticates and identifies the monitoring device 14 according to techniques known in the art and parses the body of the received SUBSCRIBE message to know whether the monitoring device 14 already knows the list of attributes, with the related predetermined values, that are associated with said user appliance 130. When recognizes that the monitoring device 14 does not know the list of attributes, with the related predetermined values, the server 12 checks whether it has already stored at its database said list. In the affirmative (case not shown), it retrieves from its database the stored list of attributes, with the related predetermined values, and sends it to the server 12. In the negative (case shown in FIG. 4), it requests the user appliance 130 for its list of attributes, with the related predetermined values, for example by sending to it a SIP SUBSCRIBE message containing such request.

The user appliance 130 receives said request, acknowledges the SUBSCRIBE message with a 200 OK SIP message and sends to the server 120 a NOTIFY message notifying its list of attributes and the related predetermined values. The 200 OK SIP message is propagated to the monitoring device 14 through server 120 and server 12.

The server 120 receives the list of attributes and the related predetermined values, from the user appliance 130, stores the received list of attributes, with the related predetermined values, in its database and sends them to the server 12 through a NOTIFY message.

The server 12 receives the list of attributes, with the related predetermined values, from the server 120, stores the received list of attributes, with the related predetermined values, in its database and sends the list of attributes, with the related predetermined values, to the monitoring device 14 through a NOTIFY message.

The monitoring device 14 receives the list of attributes, with the related predetermined values, stores them in a suitable monitoring device database, and acknowledges the NOTIFY message with a 200 OK message, that is propagated to the user appliance 130 through server 12 and server 120.

Moreover, upon receipt from the server 120 of the SUBSCRIBE message containing the request for its list of attributes, with the related predetermined values, the user appliance 130 sends to the server 120 a NOTIFY message reporting the values, among the predetermined ones, currently taken by its attributes.

The server 120 receives said NOTIFY message from the user appliance 130 and sends a NOTIFY message to the server 12 notifying said values.

The server 12 receives said NOTIFY message from the server 120 and sends it to the monitoring device 14.

The monitoring device 14 receives the NOTIFY message from the server 12, stores the received values in the monitoring device database and acknowledges the NOTIFY message with a 200 OK message, that is propagated to the user appliance 130 through server 12 and server 120.

At this time, any time the value taken by one of the attributes of the user appliance 130 changes, the user appliance 130 will report the server 120 about the change through a suitable PUBLISH message and the server 120 will notify said change to the server 12 through a suitable NOTIFY message and the server 12 will forward said NOTIFY message to the monitoring device 14 (not shown).

It is noted that, even if not shown, before sending the SUBSCRIBE message to the server 12, the monitoring device 14 will check whether the list of attributes with the related predetermined values, that are associated with user appliance 130, has already been stored in the monitoring device database. In the negative, the monitoring device 14 will send to the server 12 a request for said list, as disclosed above. In the affirmative, it will abstain from sending said request to the server. According to an embodiment, it may send in the body of the SUBSCRIBE message suitable data informing that monitoring device 14 already knows the list. In this case, the server 12 and the server 120, recognizing that the monitoring device 14 already knows the list, will abstain from sending the list to the monitoring device 14.

It is noted that even if in the embodiments shown the monitoring devices 140, 14 are disclosed as playing a "monitoring role" and the user appliances 130 are disclosed as playing a "monitored role", according to the invention, the monitoring devices and the user appliances may be adapted to act also in both roles. Moreover, also the server 120, 12 and the gateway 110 may be adapted to act in either of the two roles or in both.

Figure 5:
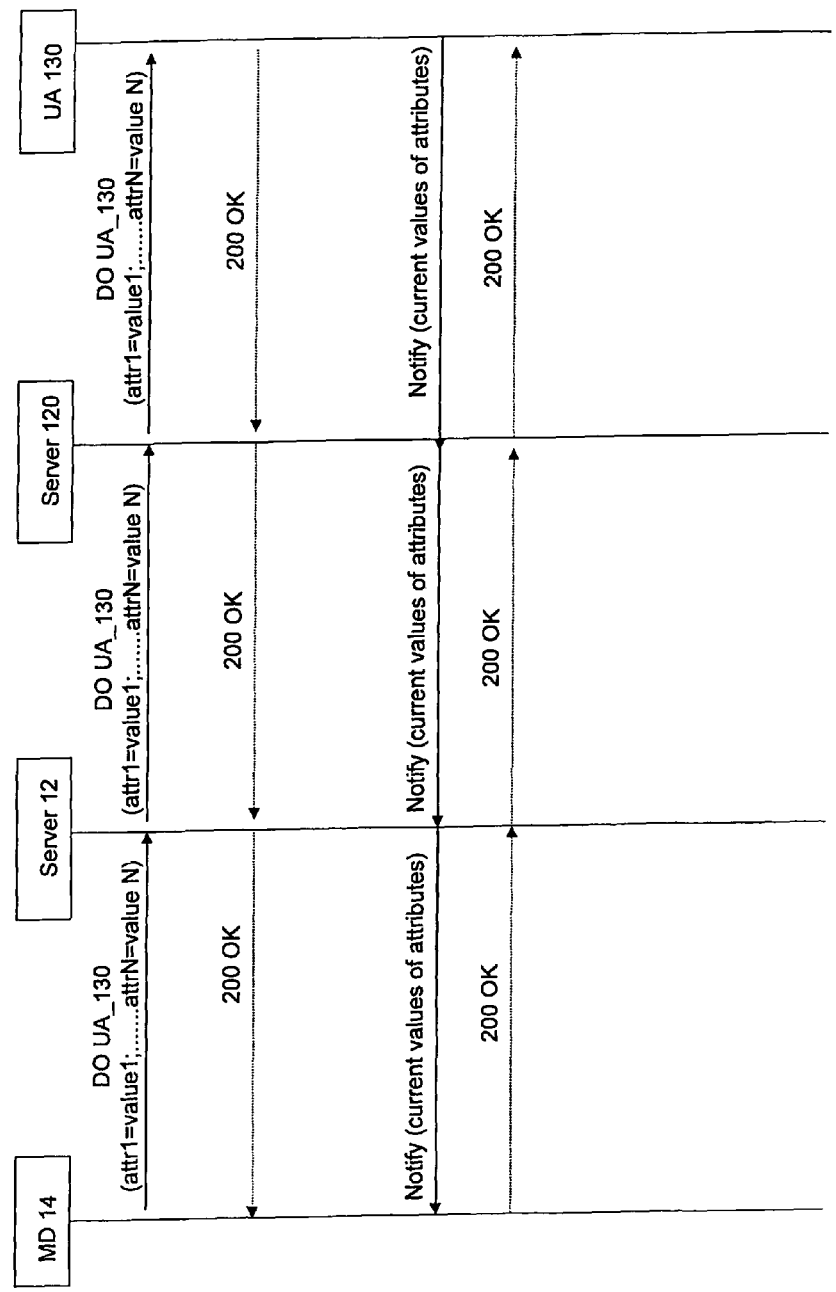
FIG. 5 schematically shows a message flow for another exemplary implementation of the invention with reference to the communication system of FIG. 3.

FIG. 5 shows an example of the principal messages exchanged in the communication system of FIG. 3, when the user of the external monitoring device 14 (e.g., the homeowner) wants to set the attributes of a user appliance 130 within the LAN 100 (e.g., within the user's home) to values selected among the predetermined values that can be taken by said attributes.

To this purpose, the user will interrogate (e.g. through a graphical user interface shown by monitoring device 14) the monitoring device 14 to know the list of attributes with the related predetermined values associated with the user appliance 130 of its interest. The monitoring device 14 will provide the user with said list by retrieving it from its database, wherein the list has been previously stored according to the self-learning procedure disclosed with reference to FIG. 3.

In the embodiment shown, the user (e.g. through the graphical user interface shown by monitoring device 14) wants to set the attributes of user appliance 130 to desired values (e.g. attr.1=value 1, . . . attr.N=Value N). The monitoring device 14 thus sends a DO message to the server 12, comprising a body requesting to set the attributes of user appliance 130 to the desired values.

The server 12 receives the DO message from the monitoring device 14, identifies, according to techniques known in the art, the server 120 which is associated with the LAN 100 comprising the user appliance 130 and forwards said DO message to the server 120.

The server 120 receives the DO message from the server 12, authenticates and identifies the monitoring device 14 according to techniques known in the art (not shown) and forwards said DO message to the user appliance 130.

The user appliance 130 receives said DO message from the server 120, acknowledges the DO message with a 200 OK message, sets its attributes to the desired values according to the body of the DO message and sends a NOTIFY message to the server 120 reporting the new values currently taken by its attributes. The 200 OK message is propagated to the monitoring device 14 through server 120 and server 12.

The server 120 receives said NOTIFY message from the user appliance 130 and sends a NOTIFY message to the server 12 notifying said values.

The server 12 receives said NOTIFY message from the server 120 and forwards it to the monitoring device 14.

The monitoring device 14 receives the NOTIFY message from the server 12, stores the received values in its database, acknowledges the server 12 with a 200 OK message and informs the user about the received values.

The 200 OK message is propagated to the user appliance 120 through server 120 and server 12.

It is noted that, even if not shown, similar messages can be exchanged in the communication system of FIG. 1, when the user of the internal monitoring device 140 wants to set the attributes of a user appliance 130 within the LAN 100 (e.g., within the user's home) to values selected among the predetermined values that can be taken by said attributes.

Figure 6:
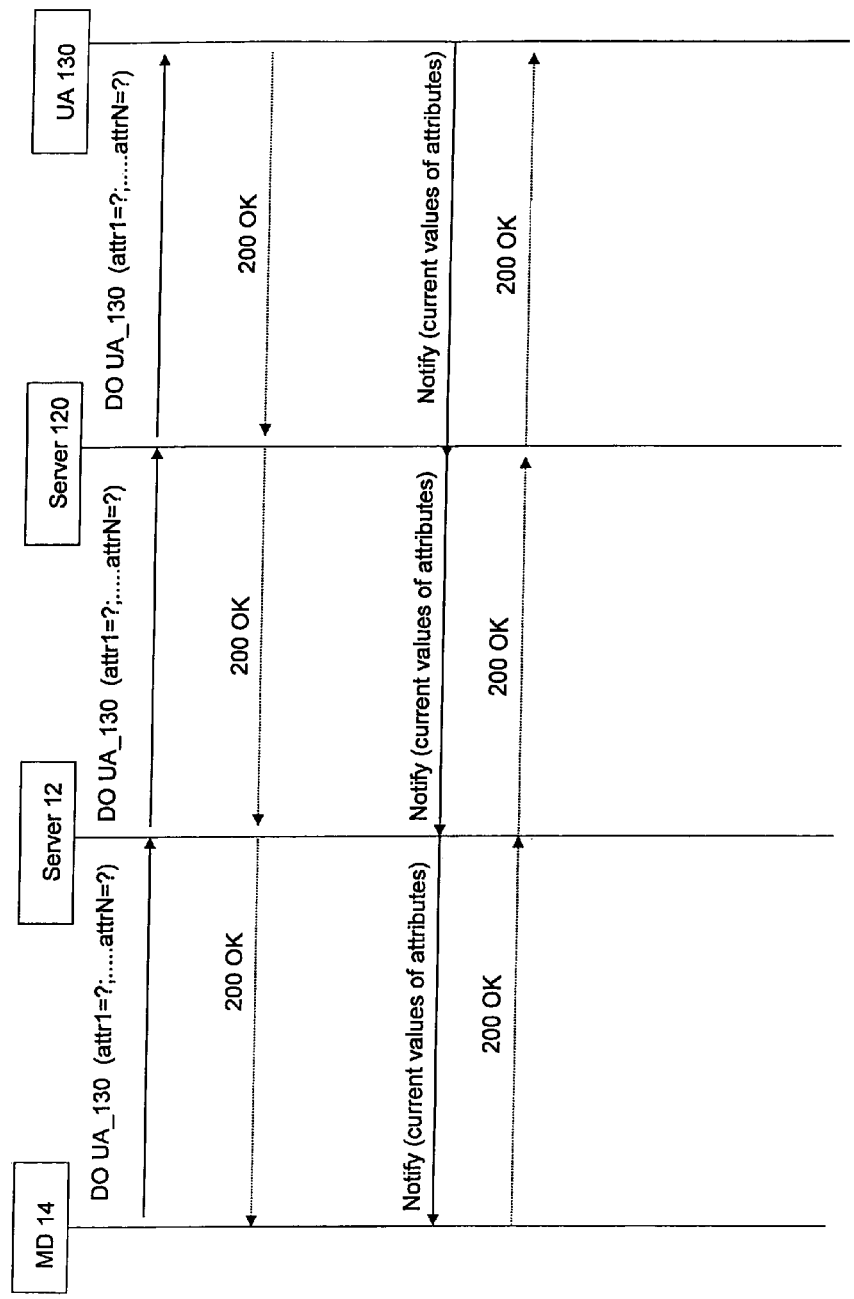
FIG. 6 schematically shows a message flow for another exemplary implementation of the invention with reference to the communication system of FIG. 3.

FIG. 6 shows an example of the principal messages exchanged in the communication system of FIG. 3, when the user (e.g., the homeowner) of the external monitoring device 14 wants to know the current values taken by all or some of the attributes of a user appliance 130 within the LAN 100 (e.g., within his home).

In the embodiment shown, the user wants to know (e.g. through the graphical user interface shown by monitoring device 14) the current values taken by all the attributes of the user appliance 130. The monitoring device 14 thus sends a DO message to the server 12, comprising a body requesting to know the current values taken by all the attributes of the user appliance 130.

The server 12 receives the DO message from the monitoring device 14, identifies, according to techniques known in the art, the server 120 which is associated with the LAN 100 comprising the user appliance 130 and forwards said DO message to the identified server 120.

The server 120 receives the DO message from the server 12, authenticates and identifies the monitoring device 14 and forwards said DO message to the user appliance 130.

The user appliance 130 receives said DO message from the server 120, acknowledges the DO message with a 200 OK message and sends a NOTIFY message to the server 120 reporting the values currently taken by its attributes. The 200 OK message is propagated to the monitoring device 14 through server 120 and server 12.

The server 120 receives said NOTIFY message from the user appliance 130 and sends a NOTIFY message to the server 12 notifying said values.

The server 12 receives said NOTIFY message from the server 120 and forwards it to the monitoring device 14.

The monitoring device 14 receives the NOTIFY message from the server 12, stores the received values in its database, acknowledges the server 12 with a 200 OK message and informs the user about the received values. The 200 OK message is propagated to the user appliance 130 through server 120 and server 12.

It is noted that, even if not shown, similar messages can be exchanged in the communication system of FIG. 1, when the user of the internal monitoring device 140 wants to know the current values taken by all or some of the attributes of a user appliance 130 within the LAN 100.

In view of the above description of the invention, the invention allows a user to perform a remote monitoring and control of user appliances within a LAN through a monitoring device, which can be part of the LAN or connected to the LAN through an external network.

In particular, preferred embodiments of the invention enable a user to be informed anywhere (for example, at his mobile phone) about the values currently taken by the attributes of the appliances within the LAN (e.g., at his home, office or car) and to set the attributes thereof at desired values.

As already stated above, in a networked appliance system there can be a very wide variety of types of appliances (e.g., CD-player, videocassette recorder, alarm clock, camera, door bell, sprinkler, air-conditioning system, heating system, temperature sensor, washing machine, dishwasher, alarm system, PC, printer, fax machine, phones, and so on) having different functionality. Moreover, similar appliances manufactured by different companies or belonging to different models of the same manufacturing company will have different features and capabilities. For example, washing machine of model XX could have the following attribute list: power; program of operation; and such attributes could take the following values: power=on/off; program of operation: 1=Wool at 30° C., 2=Cotton at 90° C., 3=Cotton at 60° C., 4=Colored at 40° C. On the other hand, washing machine of upgraded model YY could have a different attribute list: power, temperature of operation, program of operation, spin-dryer speed; and such attributes could take the following values: power=on/off; temperature of operation=30, 40, 60, 90° C.; program of operation: Cotton, Wool, Colored . . . ; spin-dryer speed=300, 400, 600, 900 rpm.

The invention enables each appliance to be pre-configured only with the list of its attributes and with the values that can be taken by said attributes. In fact, according to the invention, the monitoring devices, interested in communicating with said appliance, and the server(s), if any, involved in said communication, are adapted to learn, directly from said appliance or through the intermediation of a server, the attribute list and the related possible values of the appliance.

This allows the capability of each appliance to be fully exploited in that it allows the list of the attributes with the related values of each appliance to be defined case by case according to the actual capabilities of the appliance, without the restriction to follow a prefixed scheme.

Moreover, it ensures a great flexibility of use in that the installation of a new appliance in a networked appliance system only requires the configuration of the new appliance with the list of the attributes thereof and with the values that can be taken by said attributes, according to the actual capabilities of the new appliance. Then, the interested devices have the possibility to learn the attributes and related values of the new appliance, through the self-learning procedure of the invention.

Figure 7:
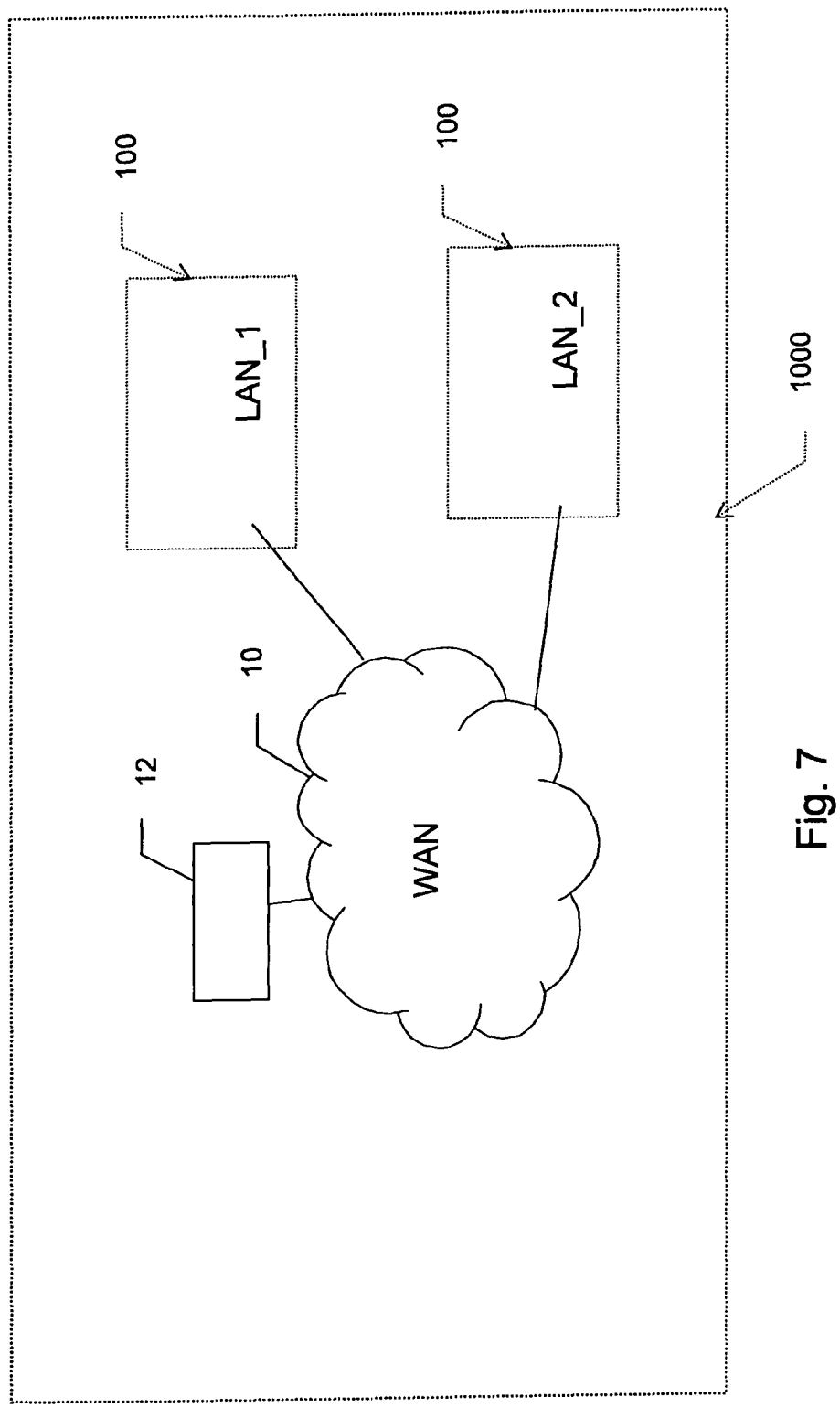
FIG. 7 schematically shows an further embodiment of a communication system according to the invention.
Figure 8:
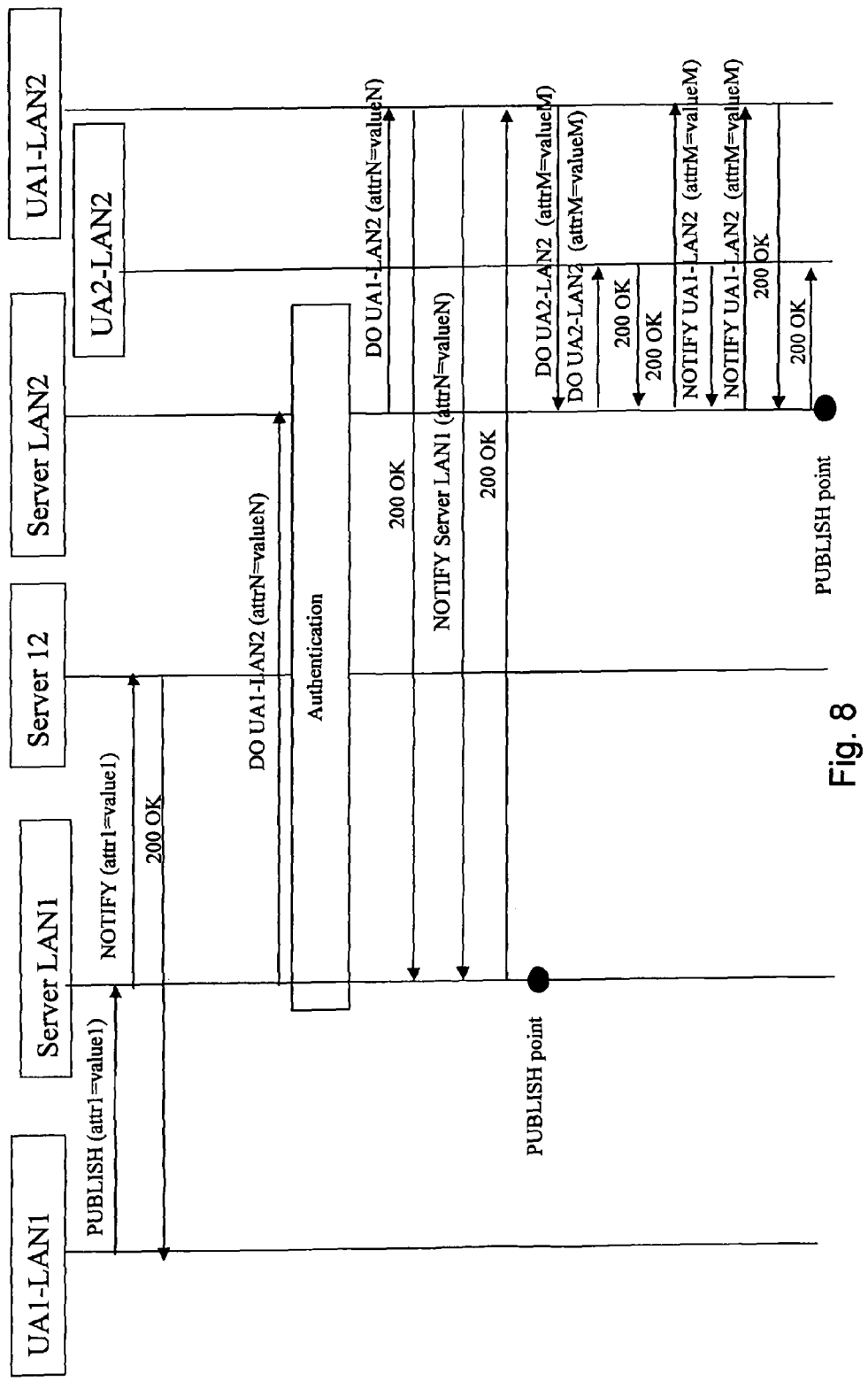
FIG. 8 schematically shows a message flow for an exemplary implementation of the invention with reference to the communication system of FIG. 7.

FIG. 8 shows another example of the principal messages that can be exchanged in the case of a communication system 1000 according to a further embodiment of the invention shown in FIG. 7. The communication system of FIG. 7 comprises two local area networks (LAN_1 and LAN_2) 100, a wide area network (WAN) 10 and a WAN server 12 associated with the wide area network 10.

As to the structural and functional features of the local area networks 100, the wide area network 10 and the WAN server 12 reference is made to what disclosed above with reference to FIGS. 1 to 6.

In the message flow of FIG. 8, the server of LAN_1 (server LAN1) receives a PUBLISH message from user appliance UA1 of the LAN_1 (UA1-LAN1) reporting the current value of an attribute thereof (e.g., attr1=value1). Upon receipt of said message, server LAN_1 is adapted to send a NOTIFY message to the WAN server 12 notifying said current value. Moreover, being triggered by the value (or values) received, server LAN1 also sends a DO message to set an attribute of user appliance UA1 of LAN_2 (UA1-LAN2) to a desired value (e.g., attrN=valueN). At the receipt of said DO message, WAN server 12 and the server of LAN_2 (server LAN2), authenticate and identify server LAN_1. Said DO message is, thus, forwarded to UA1-LAN2. UA1-LAN2 acknowledges with a 200 OK message and sends, through server LAN_2 and WAN server 12, a NOTIFY message to server LAN_1 notifying the new current value taken by its attribute (e.g., attrN=valueN). Server LAN_2, WAN server 12 and server LAN_1 acknowledge with a 200 OK message.

In the remainder of the message flow of FIG. 8, it is further contemplated the example in which, upon receipt of the DO message (e.g., attrN=valueN) from server LAN2, user appliance UA1-LAN2 is configured to send a further DO message to user appliance UA2 of LAN_2 (UA2-LAN2), through server LAN2, to set an attribute of UA2-LAN2 to a desired value (e.g., attrM=valueM). UA2-LAN2 acknowledges with a 200 OK message and sends, through server 120 LAN_2, a NOTIFY message to UA1-LAN2 notifying the new current value taken by its attribute (e.g., attrM=valueM).

The above messages may, for example, be exchanged when LAN_1 covers a car and LAN_2 covers a home of the same user. In this case, the server at the user's car (server LAN_1) may be configured to send a DO message to switch the air conditioning system on at the user's home (that is, to set attrN=valueN on UA1-LAN_2), when the user's car navigator (UA1-LAN_1) sends to the server at the user's car (server LAN_1) a PUBLISH message reporting that the estimated time to arrive at home (LAN_2) is 30 minutes.

Moreover, at the switching on (when setting attrN to value N), the air conditioning system at the user's home (that is, UA1-LAN_2) may be designed so as to send a DO message to close the windows at the user's home (that is, to set attrM=valueM on UA2-LAN_2).

In FIG. 8, the publish points at the server 120 of LAN1 and at the server 120 of LAN2 indicate that the servers may be designed to notify the received NOTIFY message to other user appliances within the same LAN.

It is noted that even if not shown, the invention applies also to other communication system architectures. For example the invention may apply to an architecture wherein an external monitoring device is adapted to be connected to the user appliances within the LAN only through the intermediation of the LAN server (without ECN server) or only through an ECN server (without LAN server).

Moreover, even if not shown, it is noted that according to another implementation of the invention, messages between server 120 and the user appliances 130 may be exchanged according to a specific machine proprietary language other than SIP.

The invention claimed is:

1. A method for operating a server of a communication system, the communication system comprising at least one user appliance and a monitoring device that is capable of being adapted to perform a remote monitoring of the at least one user appliance through intermediation of the server, the at least one user appliance being associated with a respective list of attributes, wherein each attribute corresponds to a predetermined set of potential values which the attribute may potentially embody, the method performed by the server comprising:

1) receiving the attributes associated with the at least one user appliance from at least one user appliance, the attributes being preconfigured at the user appliance;

2) for each received attribute, receiving the corresponding predetermined set of potential values that the attribute may embody;
3) storing at the server the received attributes and the corresponding predetermined sets of potential values; and
4) sending said attributes and corresponding predetermined sets of potential values to the monitoring device as part of a self-learning process for the monitoring device.

2. The method according to claim 1, wherein receiving the attributes and receiving the corresponding predetermined sets of potential values occurs:
in conjunction with a message from the at least one user appliance requesting to be registered at the server, or
in reply to a request sent from the server to the at least one user appliance, said request being sent in consequence of reception of a message from the at least one user appliance requesting to be registered at the server, or
in consequence of reception of a subscribing message, said subscribing message being sent from the monitoring device to the server for subscribing the monitoring device to the at least one user appliance.

3. The method according to claim 2, wherein, the subscribing message is a SIP SUBSCRIBE type message and in step 1) the server receives the attributes and the corresponding predetermined sets of values, respectively, in at least one SIP NOTIFY type message.

4. The method according to claim 1, wherein the server receives from the monitoring device a subscribing message for subscribing to the at least one user appliance.

5. The method according to claim 4, wherein, said subscribing message comprises a request to receive the attributes associated with the at least one user appliance and the corresponding predetermined sets of potential values.

6. The method according to claim 4, wherein, subordinated to the receipt of said subscribing message, the server requests to the at least one user appliance the respective list of attributes and the corresponding predetermined sets of potential values.

7. The method according to claim 1, further comprising:
5) receiving, from the at least one user appliance, a current value of at least one of the attributes, the current value being one of the potential values for that attribute.

8. A method for managing, at a monitoring device of a communication system, a remote monitoring of at least one user appliance, the at least one user appliance being associated with a respective list of attributes, wherein each attribute corresponds to a predetermined set of potential values which the attribute may potentially embody, the method performed by the monitoring device comprising:
a) receiving, from a server or from the at least one user appliance, the attributes associated with the at least one user appliance from at least one user appliance, the attributes being preconfigured at the user appliance;
b) for each received attribute, receiving the corresponding predetermined set of potential values that the attribute may embody; and
c) storing at the monitoring device as part of a self-learning process for the monitoring device the received attributes and the corresponding predetermined sets of potential values.

9. The method according to claim 8, further comprising:
d) sending a subscribing message for subscribing to the at least one user appliance.

10. The method according to claim 9, wherein said subscribing message comprises a request for the list of attributes associated with the at least one user appliance and the corresponding predetermined sets of potential values.

11. The method according to claim 9, wherein, in step a) the monitoring device receives the attributes and the corresponding predetermined sets of potential values, respectively, in reply to said subscribing message.

12. The method according to claim 9, wherein the subscribing message is a SIP SUBSCRIBE type message.

13. The method according to claim 8, wherein in step a) the monitoring device receives the attributes and the corresponding predetermined sets of potential values, respectively, in at least one SIP NOTIFY type message.

14. A communication system comprising a server, a monitoring device and a local area network, the local area network comprising a plurality of user appliances, each user appliance being associated with a respective list of attributes, wherein each attribute corresponds to a predetermined set of potential values which the attribute may potentially embody, the attributes and the corresponding predetermined sets of potential values being preconfigured at the respective user appliance, wherein:
each user appliance is associated with modules capable of being adapted to communicate the respective attributes and the corresponding predetermined sets of potential values to the server;
the server comprises modules capable of being adapted to receive from the user appliances (1) their respective attributes and (2) the corresponding predetermined sets of potential values, to store the attributes and predetermined sets of values, to communicate the attributes and predetermined sets of potential values to the monitoring device; and
the monitoring device is associated with modules capable of being adapted to receive from the server said attributes and predetermined sets of potential values and to store them as part of a self-learning process for the monitoring device.

15. A server for use in a communication system, the communication system comprising at least one user appliance and a monitoring device, the at least one user appliance being associated with a respective list of attributes, wherein each attribute corresponds to a predetermined set of potential values which the attribute may potentially embody, the server including a processor and memory and being adapted to carry out the method according to claim 1.

16. A monitoring device for remote monitoring at least one user appliance associated with a respective list of attributes, wherein each attribute corresponds to a predetermined set of potential values which the attribute may potentially embody, the monitoring device including a processor and memory and being adapted to carry out the method according to claim 8.

* * * * *